US012795295B2

(12) United States Patent
Hortig et al.

(10) Patent No.: US 12,795,295 B2
(45) Date of Patent: Nov. 10, 2026

(54) SENSOR DEVICE, VEHICLE, PRODUCTION METHOD, AND MOUNTING METHOD

(71) Applicant: Robert Bosch GmbH, Stuttgart (DE)

(72) Inventors: Michael Hortig, Eningen U. A. (DE); Wolfgang Woernle, Neustetten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 231 days.

(21) Appl. No.: 18/692,250

(22) PCT Filed: Oct. 12, 2022

(86) PCT No.: PCT/EP2022/078362

§ 371 (c)(1),
(2) Date: Mar. 14, 2024

(87) PCT Pub. No.: WO2023/072595

PCT Pub. Date: May 4, 2023

(65) Prior Publication Data

US 2024/0388840 A1 Nov. 21, 2024

(30) Foreign Application Priority Data

Oct. 26, 2021 (DE) ..................... 10 2021 212 060.1

(51) Int. Cl.
*H04R 1/28* (2006.01)
*H04R 1/02* (2006.01)
(Continued)

(52) U.S. Cl.
CPC ........... *H04R 1/2892* (2013.01); *H04R 1/025* (2013.01); *H04R 1/04* (2013.01); *H04R 1/08* (2013.01);
(Continued)

(58) Field of Classification Search
CPC .. H04R 1/2869; H04R 1/2876; H04R 1/2884; H04R 1/2892; H04R 2410/03; H04R 2499/13
See application file for complete search history.

(56) References Cited

U.S. PATENT DOCUMENTS 4,440,982 A * 4/1984 Kaanders ............. H04R 25/604 381/322
4,620,605 A * 11/1986 Gore ...................... H04R 1/222 381/372
(Continued)

FOREIGN PATENT DOCUMENTS

CN 2829267 Y * 10/2006
CN 115442462 A * 12/2022 ........... H04R 1/2892
(Continued)

OTHER PUBLICATIONS

International Search Report for PCT/EP2022/078362, Issued Feb. 13, 2023.

*Primary Examiner* — Ryan Robinson
(74) *Attorney, Agent, or Firm* — NORTON ROSE FULBRIGHT US LLP

(57) ABSTRACT

A sensor device. The sensor device has a sensor housing, which includes a circuit carrier including a microphone sensor, a cover, and a housing body, which has an internal space. The circuit carrier is arranged in the internal space. The sensor device includes at least one elastic outer damper, which is arranged on an outer side of the sensor housing on the cover and/or on the housing body.

8 Claims, 6 Drawing Sheets

(51) Int. Cl.
*H04R 1/04* (2006.01)
*H04R 1/08* (2006.01)
*H04R 31/00* (2006.01)

(52) U.S. Cl.
CPC ....... *H04R 31/006* (2013.01); *H04R 2499/13* (2013.01)

(56) References Cited

U.S. PATENT DOCUMENTS

| | | | | |
|---|---|---|---|---|
| 6,614,911 | B1 * | 9/2003 | Watson | H04B 1/3805 381/357 |
| 7,324,653 | B2 * | 1/2008 | Mehr | H04R 25/604 381/328 |
| 7,561,684 | B2 * | 7/2009 | Tsutaichi | H04M 1/18 381/361 |
| 7,657,025 | B2 * | 2/2010 | Hsu | H04M 1/03 381/361 |
| 7,657,052 | B2 * | 2/2010 | Larson | H04R 3/00 381/361 |
| 7,912,511 | B2 * | 3/2011 | Toki | H04M 1/03 379/433.03 |
| 8,515,113 | B2 * | 8/2013 | Rothkopf | H04R 1/02 381/369 |
| 9,301,075 | B2 * | 3/2016 | Friel | H04R 19/04 |
| 10,200,799 | B2 * | 2/2019 | Flaig | H04R 25/654 |
| 11,492,249 | B2 * | 11/2022 | Tumpold | B81B 7/0061 |
| 11,838,723 | B2 * | 12/2023 | Nowak | H04R 19/04 |
| 12,401,956 | B2 * | 8/2025 | Jensen | H04R 25/505 |
| 2005/0093970 | A1 * | 5/2005 | Abe | H04N 7/15 348/E7.083 |
| 2005/0207605 | A1 * | 9/2005 | Dehe | H04R 19/04 381/369 |
| 2010/0290644 | A1 * | 11/2010 | Wu | H04R 19/005 381/174 |
| 2011/0164759 | A1 * | 7/2011 | Gratke | H04R 1/08 381/91 |
| 2019/0149934 | A1 | 5/2019 | Fischer | |
| 2020/0359118 | A1 | 11/2020 | Sato | |
| 2021/0114228 | A1 * | 4/2021 | Li | A63H 30/04 |

FOREIGN PATENT DOCUMENTS

| | | | |
|---|---|---|---|
| DE | 102005022399 | A1 | 11/2006 |
| DE | 102007011170 | A | 9/2007 |
| DE | 112018005732 | A1 | 7/2020 |
| WO | 9939545 | A2 | 8/1999 |

* cited by examiner

SENSOR DEVICE, VEHICLE, PRODUCTION METHOD, AND MOUNTING METHOD

FIELD

The present invention relates to a sensor device for a vehicle, including a circuit carrier, an elastic hold-down, and at least one elastic outer damper. The present invention also relates to the vehicle with this sensor device. In addition, the present invention relates to a method for producing the sensor device and to a mounting method for mounting the sensor device to a component of a vehicle.

BACKGROUND INFORMATION

German Patent Application No. DE 10 2005 022 399 A1 describes sensors, which are installed in sensor housings, for use in motor vehicles. In particular, the document discloses a device for fastening a circuit carrier, comprising a sensor, in a housing that can be closed with a cover. This device comprises a holding element for the circuit carrier and a hold-down arranged oppositely on the holding element, wherein the hold-down is designed to be elastic.

Vehicle components may vibrate in operation, for example, due to driving on an uneven road and/or due to vibrations of the drive motor. An outer side of the sensor device may come into mechanical contact with vibrating vehicle components, whereby potential interference signals for a microphone sensor of the sensor device are generated. In order to reduce sound attenuation, it is furthermore advantageous in microphones if a distance between an entry side of the sound, for example on a diaphragm, and the microphone sensor is as small as possible. This can be justified in that the signal quality sensed by means of a microphone sensor is dependent on the length of a sound channel between the diaphragm and the microphone sensor, which should advantageously be kept as short as possible to reduce sound attenuation. A sensor housing of a sensor device with a microphone sensor is thus preferably installed close to a respective vehicle component, whereby the risks of a disruptive mechanical contact with a vibrating vehicle component however also increase. In other words, there is typically a gap between the vehicle component and the sensor housing of the sensor device. In operation, in certain situations, there is a risk of an outer side of the sensor device striking a vibrating vehicle component. A superposition of the ambient sound, sensed by means of the microphone, with the generated noise interference signal or with a rattling as a result of mechanical contact between the outer side of the sensor device and the vehicle component considerably reduces the sensed signal quality. For example, quiet ambient noises can then hardly or even no longer be ascertained by means of the microphone on the basis of the sensed ambient sound. In the future, microphones in vehicles will become more important for autonomous driving functions, for example for sensing horn signals and/or acoustic signals from sirens of emergency vehicles, e.g., emergency vehicles of the fire department or the police.

An object of the present invention is to improve a sensor device with a microphone sensor for vehicles.

SUMMARY

The above object may be achieved according to the present invention.

The present invention relates to a sensor device comprising a circuit carrier. According to an example embodiment of the present invention, the circuit carrier comprises a microphone sensor or an acoustic sensor, which is advantageously configured to sense at least the frequencies of the sound in the environment that are audible to humans. The sensor device also comprises a sensor housing comprising a cover and a housing body, wherein the housing body has an internal space. The circuit carrier is arranged or accommodated in the internal space of the housing body. The sensor device furthermore advantageously comprises at least one holding element on the cover and/or on the housing body, which holding element is configured to hold the circuit carrier in the internal space of the housing body. The sensor device furthermore comprises at least one elastic outer damper, which is arranged on an outer side of the sensor housing. Preferably, the elastic outer damper is arranged on an outer side of the cover and/or on an outer side of the housing body. The elastic outer damper is in particular configured to at least reduce mechanical vibrations and/or an acoustic vibration of a component of a vehicle relative to the sensor housing of the sensor device, or to achieve a mechanical or acoustic decoupling between the component of the vehicle and the sensor device with the microphone sensor. The present invention results in the advantage that the sensor device can be mounted significantly closer to a component of the vehicle since the mechanical vibrations between the sensor device and the vehicle component are minimized. As a result, the sound channel can be shortened and the sound attenuation can be reduced, whereby the quality of the sensed sound signal is increased. With the sensor device according to the present invention, sound signals from the environment of the vehicle can be better differentiated and/or quieter sound signals can be sensed or ascertained. This makes improved semiautonomous or fully autonomous driving functions of a vehicle possible, e.g., an automatic response to honking or to an approaching ambulance by forming a rescue lane.

In a particularly preferred embodiment of the present invention, the sensor device comprises at least one elastic hold-down. The at least one elastic hold-down is arranged on the cover and/or the housing body. The elastic hold-down is arranged on the cover and/or the housing body such that the hold-down of the sensor device is configured to generate a holding force on the circuit carrier so that the circuit carrier is pressed against the holding elements and fixed. In other words, the circuit carrier is advantageously arranged between the elastic hold-down and the holding element, wherein the circuit carrier is braced against the holding element by a spring force of the elastic hold-down. The hold-down is thus configured to generate a holding force on the circuit carrier so that the circuit carrier is fixed in the internal space of the housing body. The elastic outer damper and the elastic hold-down are formed integrally or in one piece, wherein the cover and/or the housing body preferably has passages. In other words, the elastic outer damper and the elastic hold-down comprise a common elastic material. The elastic outer damper and the elastic hold-down are preferably designed as an insert or are produced together in a plastics injection molding process. As a result of this configuration, the elastic outer damper and the hold-down can be produced together cost-effectively.

In a further embodiment of the present invention, the sensor housing additionally comprises at least one sealing element, wherein the sealing element is elastic. The sealing element is advantageously arranged on the cover. Alternatively or additionally, the sealing element is arranged on the housing body of the sensor housing. The sealing element is in particular configured to seal the sound channel of the housing base body toward the internal space of the sensor housing in a soundproof manner. The outer damper and the sealing element are advantageously formed integrally or in one piece, wherein the cover and/or the housing body preferably has passages. In other words, the elastic outer damper and the sealing element advantageously comprise a common elastic material, e.g., an elastomer, such as silicone. The elastic outer damper and the sealing element are preferably also designed as an insert or are produced together in a plastics injection molding process. As a result of this configuration, the outer damper can be produced cost-effectively and without any additional process step.

In an advantageous embodiment of the present invention, the outer side of the sensor housing has an enlarged surface area and/or undercuts in the region of a passage of the cover and/or of the housing body for producing the outer damper. As a result of this configuration, sealing of the internal space of the housing body against environmental influences is advantageously ensured.

The present invention also relates to a vehicle comprising the sensor device according to the present invention with the microphone sensor. Accordingly, the vehicle has the advantages of the sensor device, i.e., through the sensor device according to the present invention, the vehicle is configured to sense sound signals from the environment in increased quality, since the sound channel of the microphone sensor is shortened, or the attenuation is minimized, and the interference signals for the microphone sensor are reduced by better acoustic decoupling between components of the vehicle and the sensor device.

The present invention also relates to a production method for producing a sensor device according to the present invention. The production method comprises injection molding an elastomer for forming or producing an elastic outer damper on an outer side of a sensor housing of the sensor device.

Advantageously, according to an example embodiment of the present invention, when injection molding the elastomer, at least one hold-down and/or a sealing element is formed in addition to the outer damper so that the outer damper and the hold-down and/or the sealing element are in one piece. This configuration results in the advantage that an additional process step for producing the outer damper and/or the hold-down and/or the sealing element is avoided.

It may furthermore be provided that, during injection molding, the elastomer is guided by means of distribution channels and/or by means of passages through or to a cover and/or through or to a housing body of the sensor housing. This achieves very efficient injection molding.

The present invention furthermore relates to a method for mounting a sensor device to a component of a vehicle. According to an example embodiment of the present invention, the mounting method comprises arranging the sensor device according to the present invention with at least one elastic outer damper on the component of the vehicle, wherein the outer damper directly contacts the component and a pretension of the elastic outer damper is generated. The mounting method results in an acoustic decoupling between the microphone sensor and the component. In addition, relative movements between the component of the vehicle and the sensor device are avoided.

Further advantages arise from the following description of exemplary embodiments of the present invention with reference to the figures.

DETAILED DESCRIPTION OF EXAMPLE EMBODIMENTS

Figure 1:
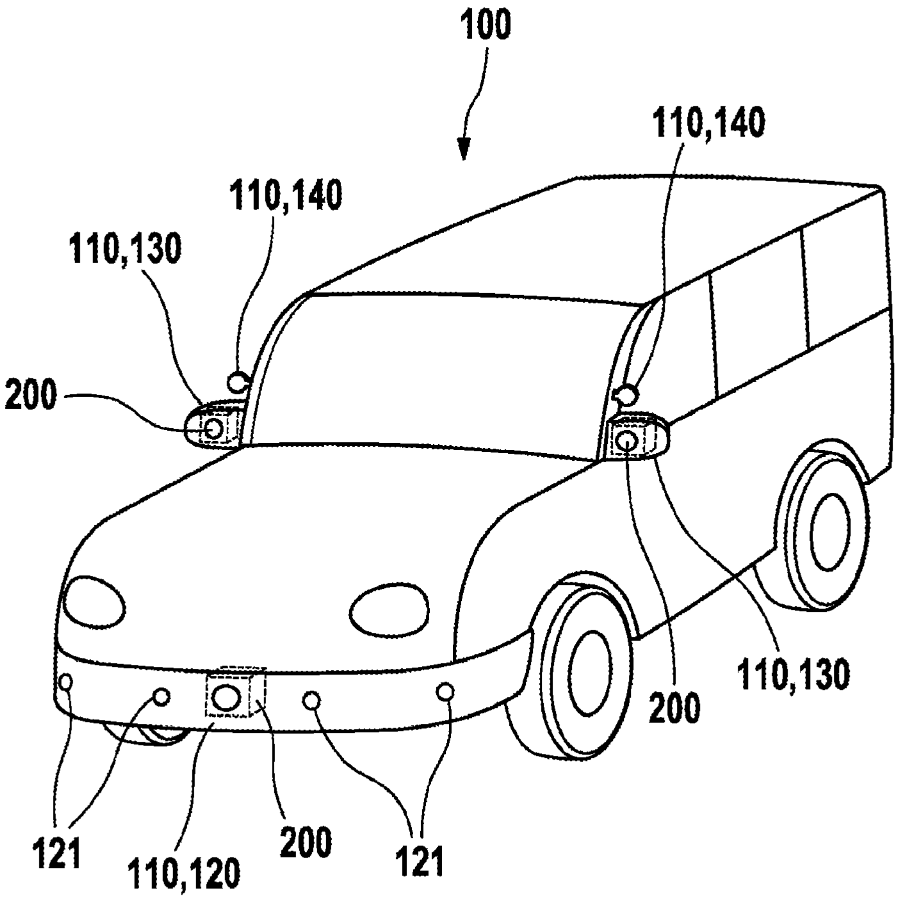
FIG. 1 shows a vehicle according to an example embodiment of the present invention.

In FIG. 1, a vehicle 100 with a sensor device 200 according to the present invention is shown schematically in a lateral three-dimensional front view. The sensor device 200 is arranged on a vehicle component 110, 120, 130, 140, for example, on a bumper 120 of the vehicle 100 and/or on a side mirror 130 of the vehicle 100 and/or on a side camera 140 of the vehicle 100. Ultrasonic sensors 121, which advantageously have a similar visual appearance for a viewer of the vehicle 100, may, for example, be arranged adjacent to the sensor device 200 according to the present invention on the bumper 120 of the vehicle 100 as a vehicle component 110. The side camera 140 as a vehicle component 110 may, for example, be part of an all-round vision system or a stereo camera. The sensor device 200 may alternatively be arranged on a bumper 120 (not shown in FIG. 1), positioned at the rear side of the vehicle 100, and oriented toward the rear environment and/or arranged, for example, on a rear view camera (not shown) of the vehicle 100 and/or on a roof structure (not shown) of the vehicle 100.

Figure 2:
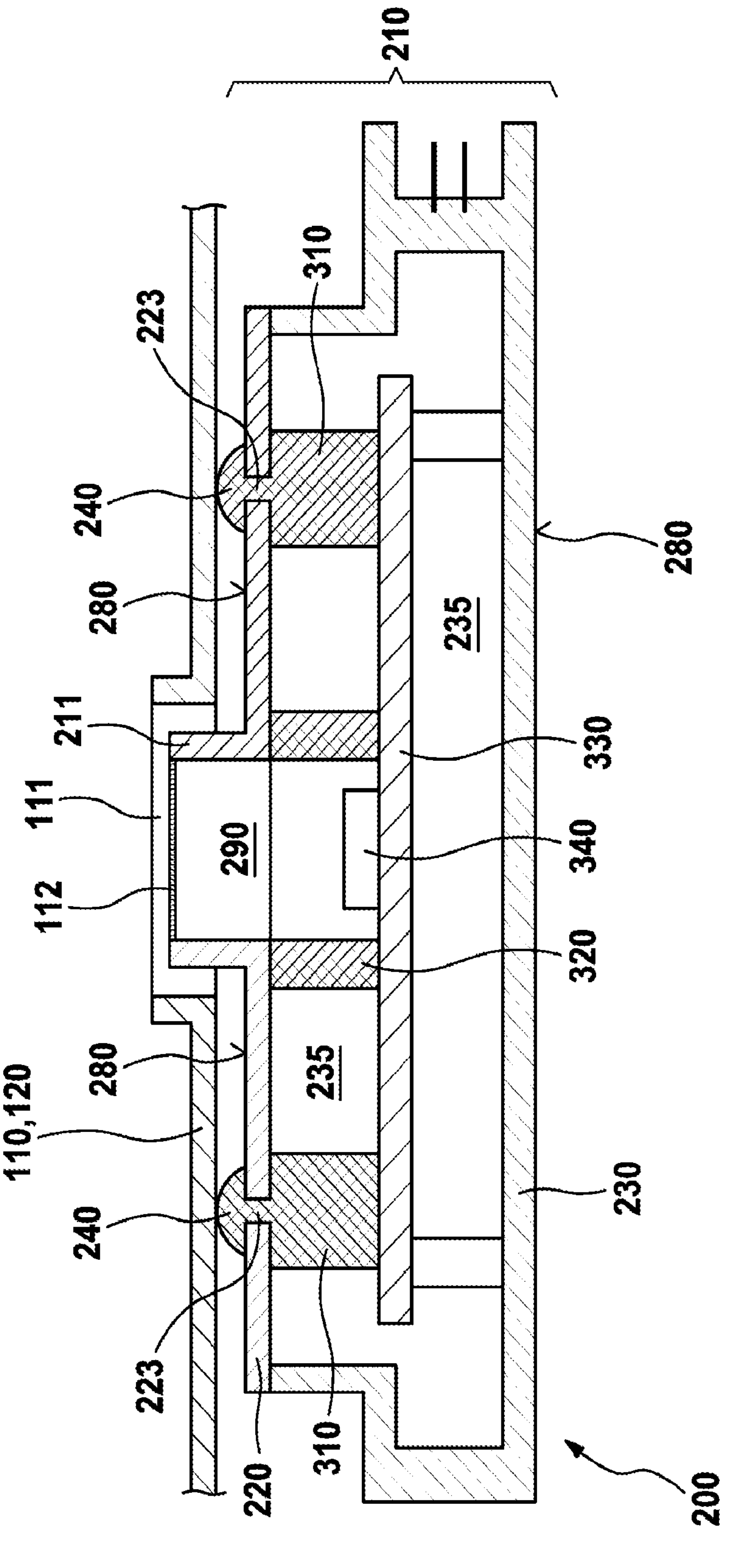
FIG. 2 shows a sensor device, three-dimensional view with vehicle component, according to an example embodiment of the present invention.

In FIG. 2, the sensor device 200 is shown schematically, by way of example, in a side view of a cross-section, with the sensor device 200 mounted on a vehicle component 110. The sensor device 200 comprises a circuit carrier 330 with a microphone sensor 340, wherein the circuit carrier 330 is accommodated or arranged or held in an internal space 235 of a housing body 230 of a sensor housing 210. Advantageously, the vehicle component 110 has a through-opening 111. Preferably, the sensor device 200 closed with a diaphragm 112 is mounted in the through-opening 111, wherein the diaphragm 112 is configured to protect a sound channel 290 between the diaphragm 112 and the microphone sensor 340 of the sensor device 200 from environmental influences, to receive sound vibrations, and to transmit the received sound vibrations into the sound channel 290. The through-opening 111 of the vehicle component 110 is advantageously circular and configured to receive an, in particular cylindrical, form 211 of a sensor housing 210 of the sensor device 200 with at least a portion of the sound channel 290. The sensor housing 200 comprises a cover 220 and a housing body 230. In this example, the cylindrical form 211 comprises a portion of the sound channel and is arranged on the cover 220. It may alternatively be provided that the form 211 is arranged on the housing body 230. FIG. 2 shows the arrangement of two outer dampers 240 between the cover 220 and the vehicle component 110, the vehicle component being a bumper, for example. Preferably, on at least one outer side 280 of the sensor housing 210, at least three outer dampers 240 are arranged; in particular, the sensor device 200 comprises four outer dampers 240, which are arranged at at least one outer side 280 of the sensor housing 210. The outer dampers 240 are advantageously in direct contact with the vehicle component 110. The outer dampers 240 are configured to dampen acoustic vibrations of the vehicle component 110 so that the microphone sensor 340 of the circuit carrier 330 is protected from noise interference, for example based on the vibrating vehicle component 110, 120.

Figure 3:
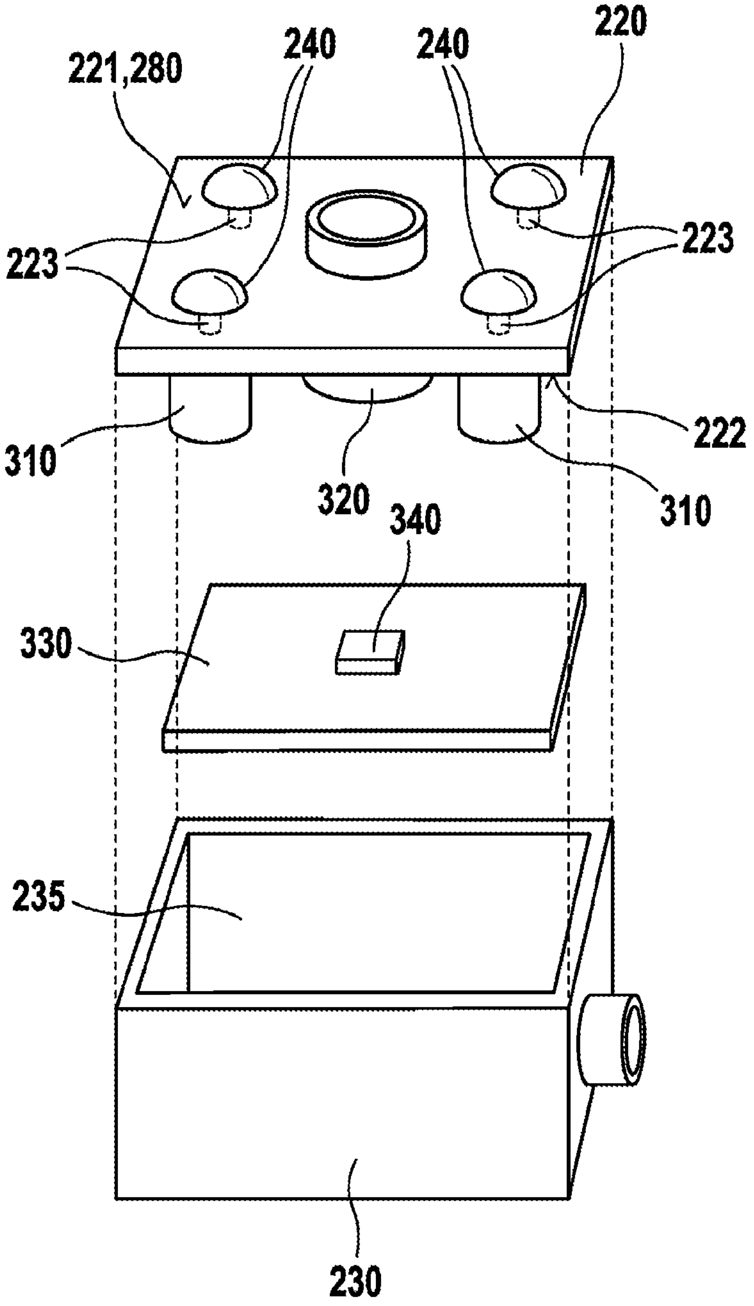
FIG. 3 shows a sensor device according to an example embodiment of the present invention, as an exploded view.

FIG. 3 shows the sensor device 200 as an exploded view schematically and in a side view. The sensor device 200 comprises the sensor housing 210, which comprises the cover 220 and the housing body 230. Four outer dampers 240 are arranged on the outer upper side or the outer side 221 of the cover 220. The cover 220 has a respective passage 223 or through-opening below each outer damper 240. On the inner side 222 of the cover 220, hold-downs 310 are advantageously respectively arranged or formed at each passage 223 (see also FIG. 2). The hold-down 310 and the outer damper 240 at a passage 223 are connected to one another through the passage 223 and comprise an elastic material or an elastomer, e.g., a silicone (see also FIG. 2). The hold-down 310 and the outer damper 240 at a passage 223 are consequently integrally formed. Particularly preferably, all hold-downs 310 and outer dampers 240 are connected to one another or are formed integrally. For example, the hold-downs 310 and the outer dampers 240 are produced together in an injection molding process, the cover 220 advantageously comprising distribution channels (not shown) for the injection molding process for this purpose. Alternatively, the hold-downs 310 and the outer dampers 240 may be part of an elastic insert produced separately from the cover 220, which insert is pushed through the passages 223 and fixed to the cover 220 in a form- and/or friction-locked manner. Particularly preferably, the hold-downs 310 and the outer dampers 240 are integrally connected to a portion of an elastic sealing element 320 (see also FIG. 2). The sealing element 320 serves to seal or form at least a portion of the sound channel 290 for the microphone sensor 340 toward the internal space 235 of the housing body 230 (see also FIG. 2). In other words, the hold-downs 310, the outer dampers 240, and the sealing element 320 are advantageously designed to be elastic and integral, i.e., materially connected to one another. The hold-downs 310 and the outer dampers 240 as well as the sealing element 320 are advantageously produced in a common injection molding process or as an integral insert. The sensor device 200 furthermore comprises the circuit carrier 330 with the microphone sensor 340. The circuit carrier 330 is configured to be held or accommodated in the internal space 231 of the housing body 230.

Figure 4:
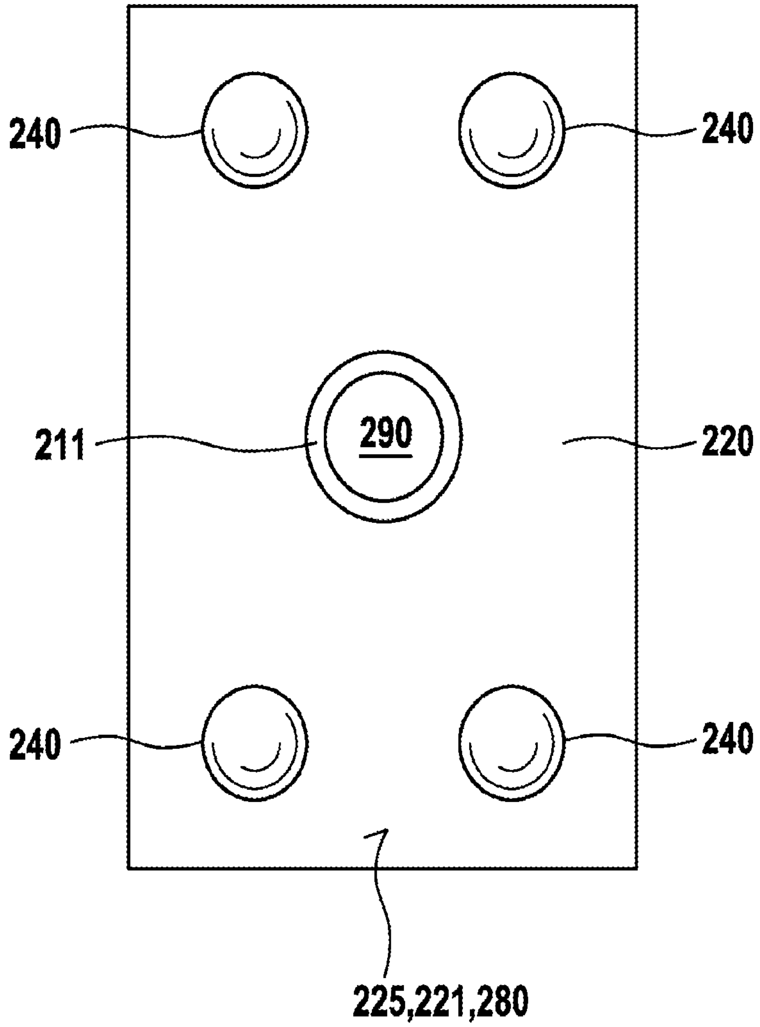
FIG. 4 shows a cover of the sensor device with outer damper, front side, according to an example embodiment of the present invention.

FIG. 4 shows a cover 220 of the sensor housing of the sensor device with four outer dampers 240 schematically in a plan view of the front side 225 of the sensor device 200 or of the outer side 221, 280 of the cover 220. The four outer dampers 240 are advantageously symmetrically arranged about the form 211 of the cover 220, wherein the form has the passage or opening of the sound channel 290.

Figure 5:
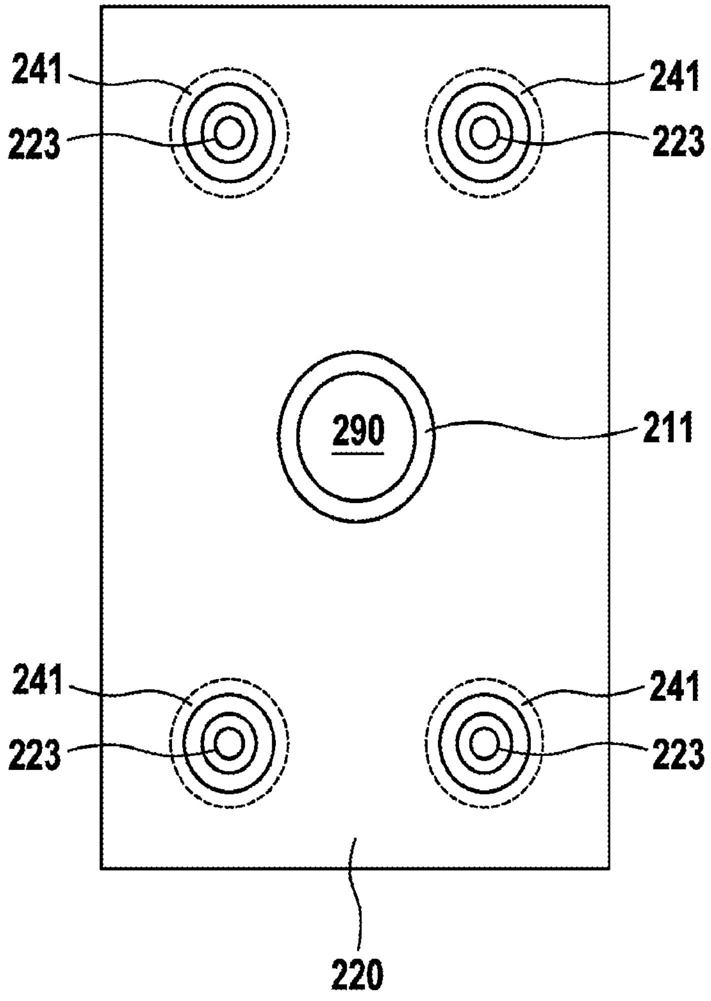
FIG. 5 shows a cover without outer damper with enlarged surface area at the passage, according to an example embodiment of the present invention.

FIG. 5 shows the cover of FIG. 4 without an outer damper with an enlarged surface area in a sealing region 241 at the passages 223. The enlarged surface area in the sealing region 241 serves to better seal the internal space 235 of the sensor housing 210 from harmful environmental influences, such as dirt, moisture, etc. The enlarged surface area in the sealing region 241 at the passages 223 may, for example, be produced through forms, undercuts, grooves, or roughening.

Figure 6:
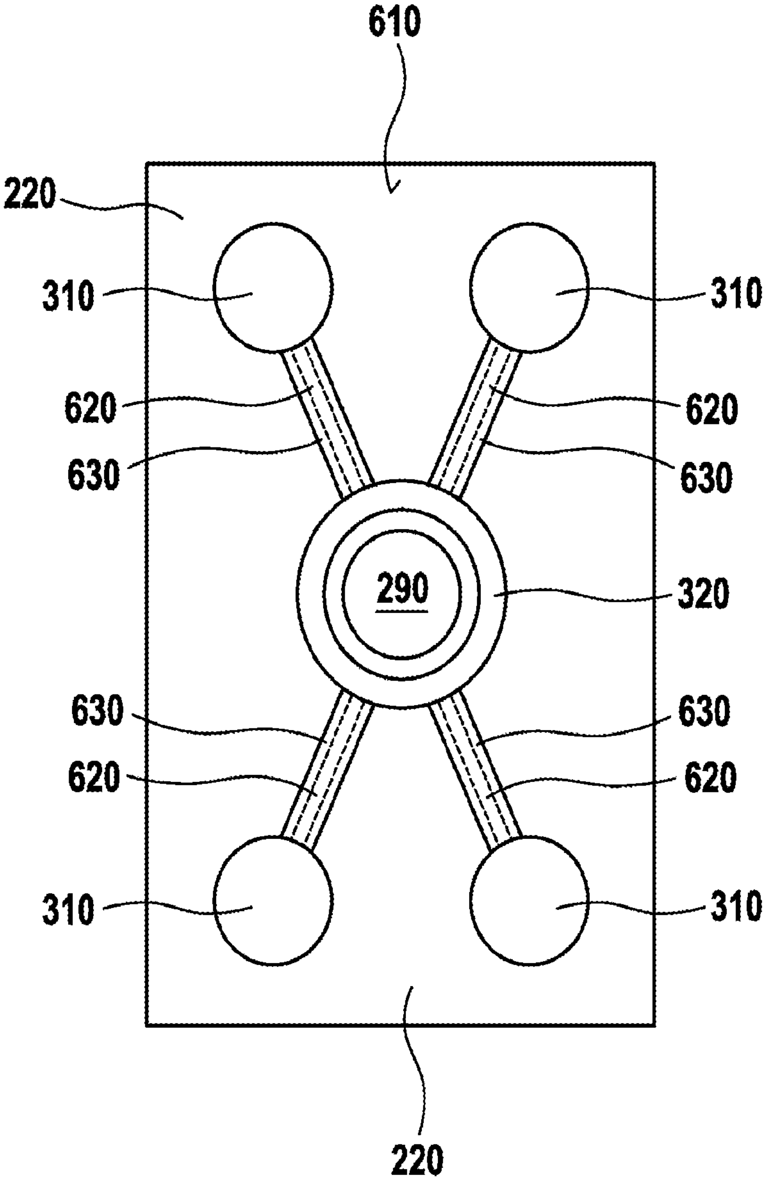
FIG. 6 shows a cover of the sensor device with outer damper, rear side, according to an example embodiment of the present invention.

FIG. 6 shows a plan view of the rear side 610 of the cover of FIGS. 4 to 5. Visible are the hold-downs 310, which are arranged at the passages 223 on the rear side 610 of the cover 220. Also shown is the sealing element 320, which is formed as a hollow cylinder and, in its interior, forms at least a portion of the sound channel 290. The cover 220 comprises distribution channels 620, which are formed as troughs or grooves between walls 630. In the injection molding process, the elastomer is, for example, injected in the region of the sealing element and is injected via the distribution channels 620 to the hold-downs 310 through the passage to form the outer dampers 240. Thus, an integral or materially connected elastomer part results, which comprises the outer dampers, the hold-downs 310, and the sealing element 320. The elastomer part may also be formed as an insert, i.e., produced separately from the cover and mounted on the cover.

The invention claimed is:

1. A sensor device, comprising:
a sensor housing, which includes
i. a circuit carrier including a microphone sensor,
ii. a cover, and
iii. a housing body, which has an internal space, the circuit carrier being arranged in the internal space; and
at least one elastic outer damper arranged on an outer side of the sensor housing on the cover and/or the housing body; and
an elastic hold-down arranged on the inner side of the cover and/or the housing body, wherein the hold-down is connected to the at least one elastic outer damper.

2. The sensor device according to claim 1,
wherein the hold-down is configured to generate a holding force on the circuit carrier so that the circuit carrier is fixed in the internal space of the housing body, wherein the elastic outer damper and the elastic hold-down are integral.

3. The sensor device according to claim 1, wherein the sensor housing further includes at least one sealing element configured to seal a sound channel of the microphone sensor toward the internal space of the housing body, wherein the sealing element is elastic, and wherein the outer damper and the sealing element are integral.

4. The sensor device according to claim 1, wherein the outer side of the sensor housing in a region of a passage of the cover and/or in a region of a passage of the housing body, has an enlarged surface area and/or undercuts in or at the passage of the cover and/or the passage of the housing body.

5. A vehicle, comprising:
a sensor device including:
a sensor housing, which includes
i. a circuit carrier including a microphone sensor,
ii. a cover, and
iii. a housing body, which has an internal space, the circuit carrier being arranged in the internal space, and
at least one elastic outer damper arranged on an outer side of the sensor housing on the cover and/or the housing body; and
an elastic hold-down arranged on the inner side of the cover and/or the housing body, wherein the hold-down is connected to the at least one elastic outer damper.

6. A method of producing a sensor device, the sensor device including a sensor housing, which includes:
i. a circuit carrier including a microphone sensor,
ii. a cover,
iii. a housing body, which has an internal space, the circuit carrier being arranged in the internal space, and an elastic hold-down arranged on the inner side of the cover and/or the housing body, wherein the hold-down is connected to the at least one elastic outer damper, the method comprising the following step:

injection molding an elastomer for forming an elastic outer damper on an outer side of the sensor housing of the sensor device.

7. The method according to claim 6, wherein, when injection molding the elastomer, at least one hold-down and/or a sealing element is formed in addition to the outer damper, wherein the outer damper and the hold-down and/or the sealing element are formed in one piece.

8. A mounting method for mounting a sensor device to a component of a vehicle, comprising the following step:

arranging a sensor device on the component of the vehicle, the sensor device including:

a sensor housing, which includes i. a circuit carrier including a microphone sensor, ii. a cover, and iii. a housing body, which has an internal space, the circuit carrier being arranged in the internal space, at least one elastic outer damper arranged on an outer side of the sensor housing on the cover and/or the housing body, wherein the elastic outer damper directly contacts the component and a pretension of the elastic outer damper is generated, and an elastic hold-down arranged on the inner side of the cover and/or the housing body, wherein the hold-down is connected to the at least one elastic outer damper.

* * * * *